United States Patent [19]

Yamanaka

[11] Patent Number: 4,988,250
[45] Date of Patent: Jan. 29, 1991

[54] BUCKET ELEVATOR TYPE CONTINUOUS SHIP UNLOADER

[75] Inventor: Masao Yamanaka, Niihama, Japan

[73] Assignee: Sumitomo Heavy Industries, Ltd., Tokyo, Japan

[21] Appl. No.: 362,780

[22] Filed: Jun. 7, 1989

[51] Int. Cl.⁵ .............................. B65G 17/36
[52] U.S. Cl. .................. 414/141.1; 198/509; 198/709; 198/710; 414/142.5
[58] Field of Search .......... 414/141.1, 142.5; 198/509, 511, 700, 709, 710

[56] References Cited

U.S. PATENT DOCUMENTS

| 2,897,769 | 8/1959 | Bishop et al. |
| 4,830,177 | 5/1989 | Baba et al. ............ 198/509 |
| 4,838,410 | 6/1989 | Gough ............ 198/710 X |
| 4,860,884 | 8/1989 | Kostrewa ............ 414/141.1 X |
| 4,890,719 | 1/1990 | Yagi et al. ............ 414/141.1 X |
| 4,917,234 | 4/1990 | Seymour ............ 198/509 X |

FOREIGN PATENT DOCUMENTS

| 0212858 | 3/1987 | European Pat. Off. |
| 0236845 | 9/1987 | European Pat. Off. |
| 3519780 | 12/1986 | Fed. Rep. of Germany |
| 57-51622 | 3/1982 | Japan ............ 414/141.1 |
| 62-108339 | 7/1987 | Japan |
| 3267606 | 11/1988 | Japan ............ 414/141.1 |
| 3267607 | 11/1988 | Japan ............ 414/141.1 |
| 1150612 | 6/1989 | Japan ............ 198/509 |
| 1150613 | 6/1989 | Japan ............ 198/509 |
| 2096087 | 10/1982 | United Kingdom |
| 2205800 | 12/1988 | United Kingdom |

Primary Examiner—Robert J. Spar
Assistant Examiner—William M. Hienz
Attorney, Agent, or Firm—Armstrong, Nikaido, Marmelstein, Kubovcik & Murray

[57] ABSTRACT

A bucket elevator type continuous ship unloader is used for both a sidewise shovelling operation and a catenary cleaning up operation. In this ship unloader, a bucket chain is wound around sprockets respectively provided at the front and rear ends of a horizontal frame and a sprocket provided above the rear sprocket such that it encircles the sprockets in an L-shaped form. The bucket chain is made loosened or taut by the upward or downward movement of the horizontal frame with respect to the upper sprocket. The horizontal frame is provided with a horizontal rail with which a roller provided on each bucket is fitted when the bucket chain is stretched tautly. During the sidewise shovelling operation, the buckets run while being guided by the rail. In consequence, the force acting on the bucket during the shovelling in the vertical direction as well as in a direction transverse to the direction of movement of the bucket is exerted on the rail. So, a bucket chain which is only strong enough to pull the buckets is required. This means that a bucket chain which is so rigid as required in the prior art is not necessary, and the weight of the bucket chain can be reduced.

19 Claims, 15 Drawing Sheets

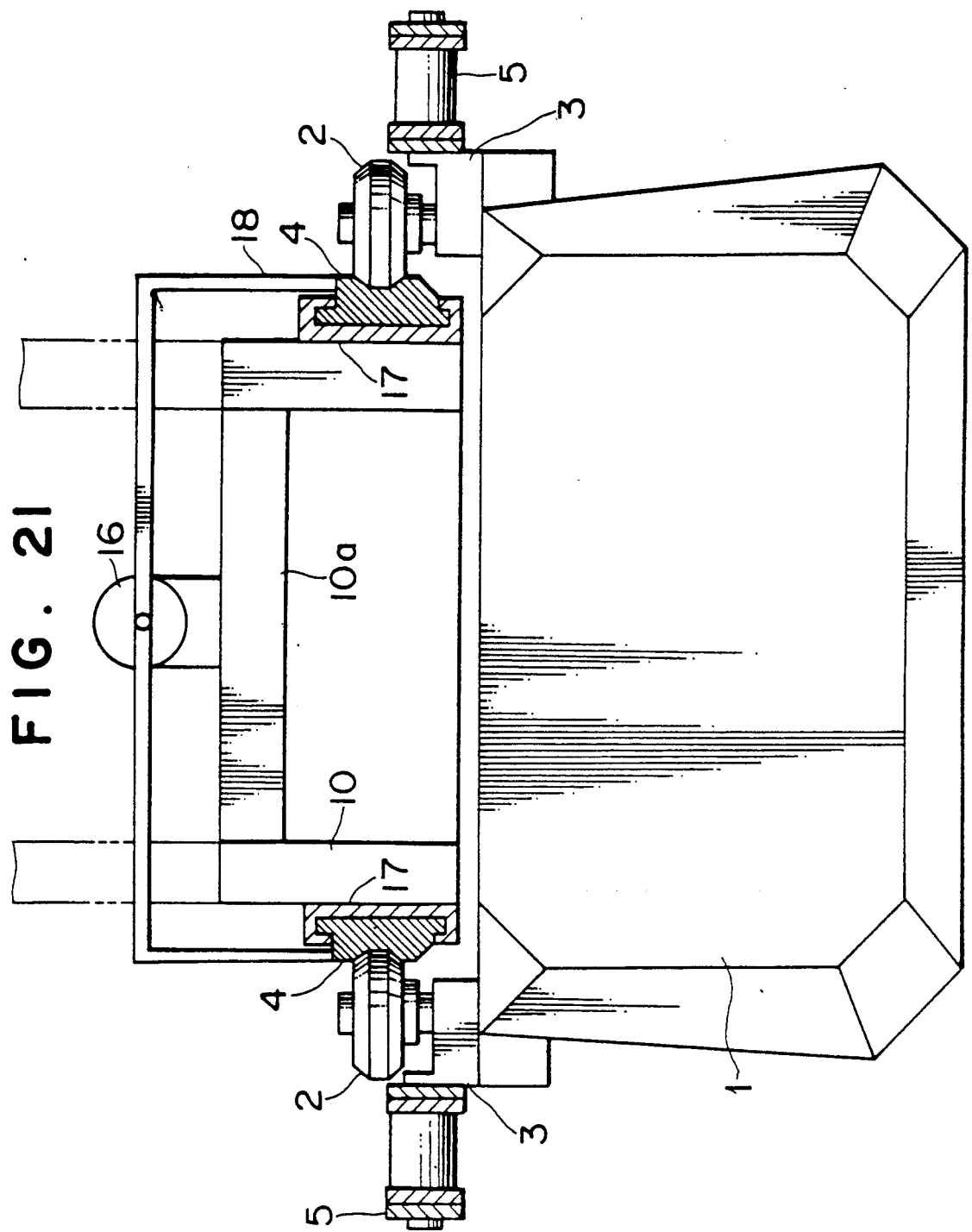

BUCKET ELEVATOR TYPE CONTINUOUS SHIP UNLOADER

BACKGROUND OF THE INVENTION

1. Field of the Invention

The present invention relates to a bucket elevator type continuous ship unloader.

2. Description of the Related Art

Cranes used to discharge bulk cargos such as coal, ore or grain from ships with a high degree of efficiency are generally called unloaders. Such unloaders are comprised of a glove bucket which grabs a cargo held in a hold and carries it out of the hold.

In recent years, however, bucket elevators have been replacing such glove buckets, offering improvements in the efficiency with which unloading can be undertaken.

These bucket elevator type continuous ship unloaders suffer from the problem that the scoop side of a bucket elevator strikes against the bottom of a ship that moves up and down during the unloading of a bulk cargo lying on the bottom, i.e., during a cleaning up operation, hence damaging the bottom of the ship and/or the buckets. Furthermore, the cargo remaining on the bottom must be collected during a cleaning up operation by means of, for example, a bulldozer that has to be carried into the hold, so that all the cargo can be carried out by the bucket elevator.

Under these circumstances, various proposals have been made with a view to meeting the increasing demand for an unloader that can obviate the above-described problems.

Japanese Utility Model Laid-Open No. 62-108339, for example, discloses a bucket elevator type continuous ship unloader which can be used for both a normal sidewise shovelling operation and a catenary cleaning up operation. In the former operation, the bulk cargo stored in a hold is shovelled by the bucket elevator which runs sidewise (in the direction perpendicular to the plane of FIG. 1, which illustrates a first embodiment of the present invention), with the bucket chain in shovel portion made taut in the horizontal direction. When the latter operation in which the bulk cargo remaining at the bottom is cleaned up is to be performed, the bucket chain is put in the form of a catenary (a loosened state) so as to enable any impact caused by the up-and-down movement of the ship bottom to be absorbed during the cleaning up of the cargo remaining at the bottom. In this type of continuous ship unloader, a front sprocket is mounted on the forward end of a pivot arm, and the bucket chain is made taut in the horizontal direction or given the form of a catenary by way of the pivot of the pivot arm. Further, a guide frame from under which the bucket chain can be inserted is provided, and in operation the bucket chain is inserted in the guide frame so that the force exerted on a bucket in a direction transverse to the direction of the bucket movement can be received by the guide frame.

However, in the above-described type of continuous ship unloader, since the guide frame receives only the force exerted on the buckets in a direction transverse to the direction of the bucket movement during the normal sidewise operation of shovelling, the bucket chain must be stretched tautly in order to make flat the surface of the cargo being shovelled by each bucket. This is because an uneven surface of the cargo would make its discharge unstable, particularly in the case of a large unloader in which a cargo is shovelled over a long distance. This requires a bucket chain which is not only rigid enough to ensure the tension required to pull a large number of buckets full of cargo, but is also able to stretch the shovel portion tautly. This means that the bucket chain is heavy, which is undesirable for a ship unloader with a cantilever boom. In addition to this, when the cargo remaining at the bottom has to be cleaned up, shovelling starts with a bucket located in the vicinity of the front sprocket mounted on the forward end of the pivot arm. This does not allow for a sufficient sag (downward bending of a bucket chain under its own weight), and therefore cannot eliminate the possibility of impact being caused by the up-and-down movement of a ship's bottom.

SUMMARY OF THE INVENTION

An object of the present invention is to provide a bucket elevator type continuous ship unloader which does not require that a bucket chain has to be very taut when a sidewise shovelling operation is to be performed, and which thus allows for use of a light bucket chain having a relatively low degree of rigidity.

Another object of the present invention is to provide a bucket elevator type continuous ship unloader which ensures a sufficient degree of sag in a catenary state and which is therefore capable of efficiently coping with up-and-down movement of a ship's bottom.

Another object of the present invention is to provide a bucket elevator type continuous ship unloader which is capable of being readily switched over between a sidewise shovelling operation mode and a catenary cleaning up mode, and which has a simple structure.

In order to achieve the aforementioned objects, the present invention provides a bucket elevator type continuous ship unloader which includes a horizontal shovelling unit frame, lower front and rear sprockets rotatably supported on the front and rear end portions of the shovelling unit frame, at least one upper sprocket rotatably supported above the rear sprocket, an endless bucket chain wound around the lower front and rear sprockets and the upper sprocket so that it encircles an L-shaped area as seen when looking from the side, a series of buckets mounted on the bucket chain at predetermined intervals, and a means for moving the shovelling unit frame up and down relative to the upper sprocket. The continuous ship unloader further includes a roller provided in the vicinity of the portion of each of the buckets through which the bucket is mounted on the bucket chain, and a horizontal rail provided on the shovelling unit frame along the path of the bucket chain which runs on a straight line between the front and rear sprockets in such a manner that it engages with the roller of each of the buckets, such that the roller runs in a state where it is in engagement with the horizontal rail when the chain is stretched tautly between the front and rear sprockets by the downward movement of the shovelling unit frame, and such that when the shovelling unit frame is moved upward, the roller disengages from the horizontal rail so as to put the bucket chain in a catenary state.

The above and other objects, structure and advantages of the present invention will become more apparent from the following description of the preferred embodiments thereof, taken in conjunction with the accompanying drawings.

BRIEF DESCRIPTION OF THE DRAWINGS

FIG. 21 is a front view of a modified example of the fourth embodiment shown in FIG. 20.

DESCRIPTION OF THE PREFERRED EMBODIMENTS

Embodiments of the present invention will now be described with reference to the accompanying drawings.

These embodiments involve a continuous ship unloader with a bucket elevator supported on the forward end of a cantilever boom, which is suitable for use in discharging bulk cargo from a hold of a ship. This ship unloader is a large one in which the interval between the axes of sprockets disposed in the longitudinal direction (in the horizontal direction as viewed in FIG. 1) near a bottom, i.e., the shovelling length, is as long as 6.5 m.

A first embodiment of the present invention will be described first.

Figure 1:
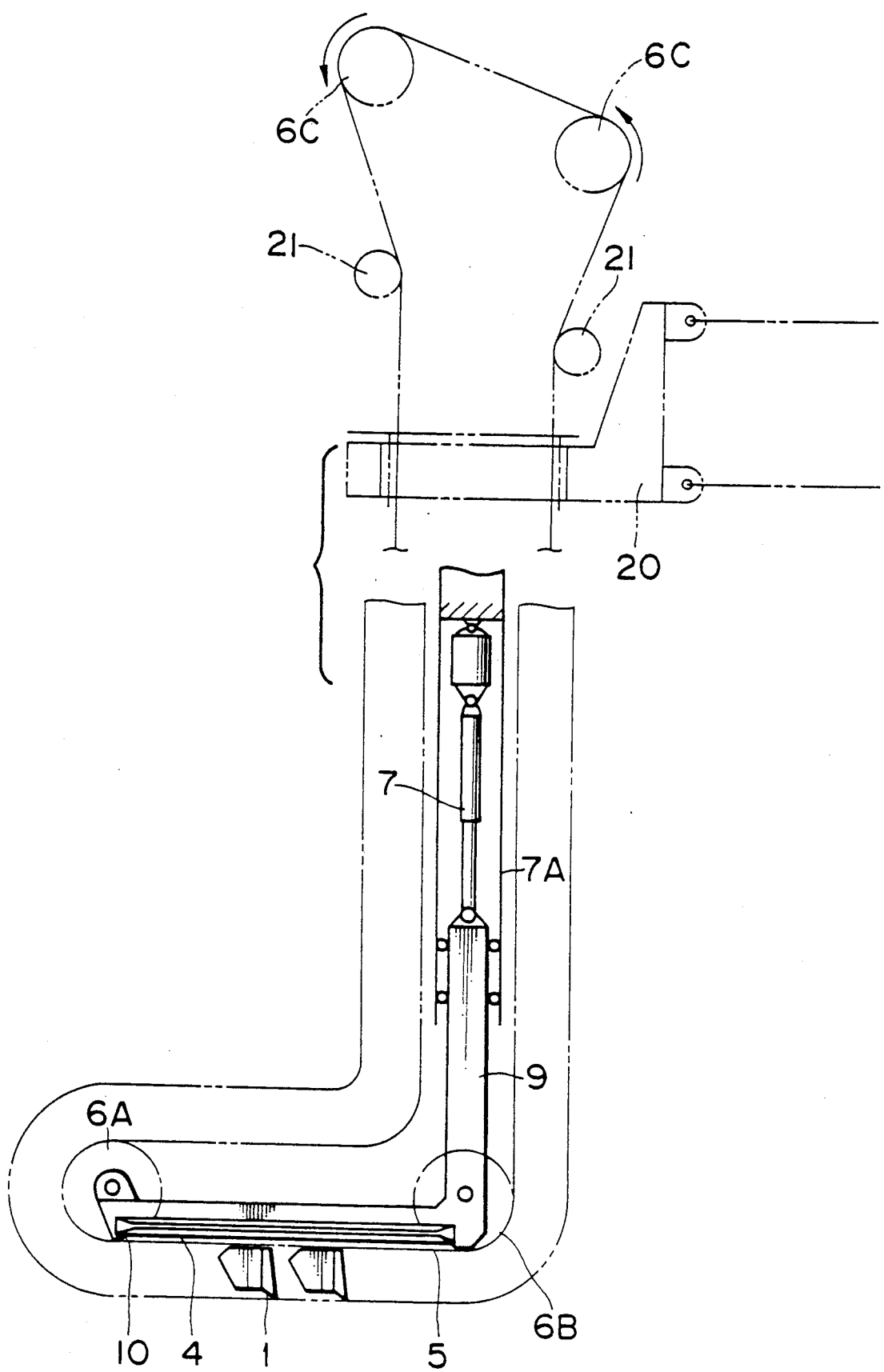
FIG. 1 is a side elevational view of a continuous ship unloader, showing a first embodiment of the present invention.
Figure 2:
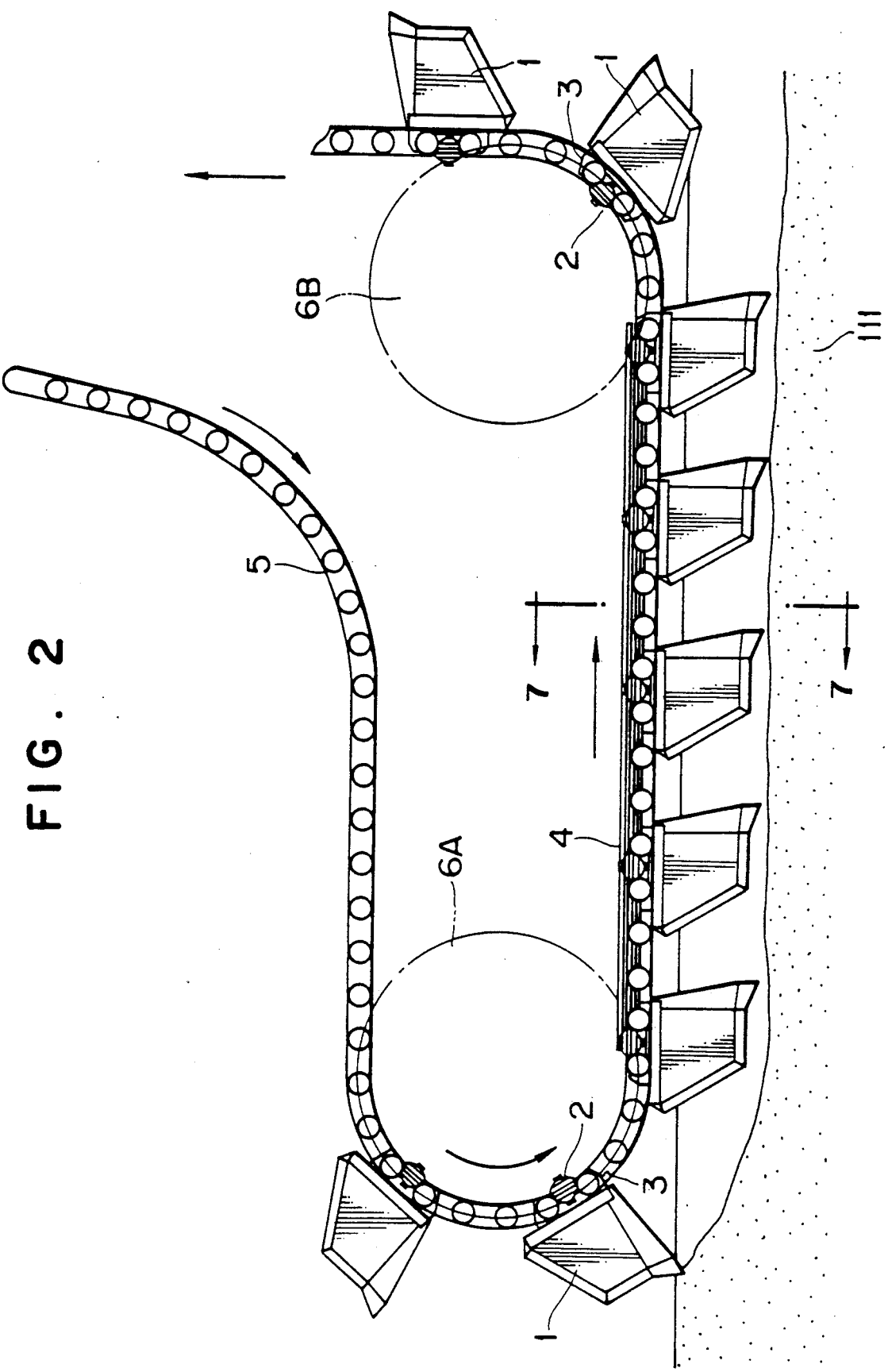
FIG. 2 is a side elevational view of the essential parts of the ship unloader of FIG. 1 with buckets being in a sidewise shovelling state.
Figure 7:
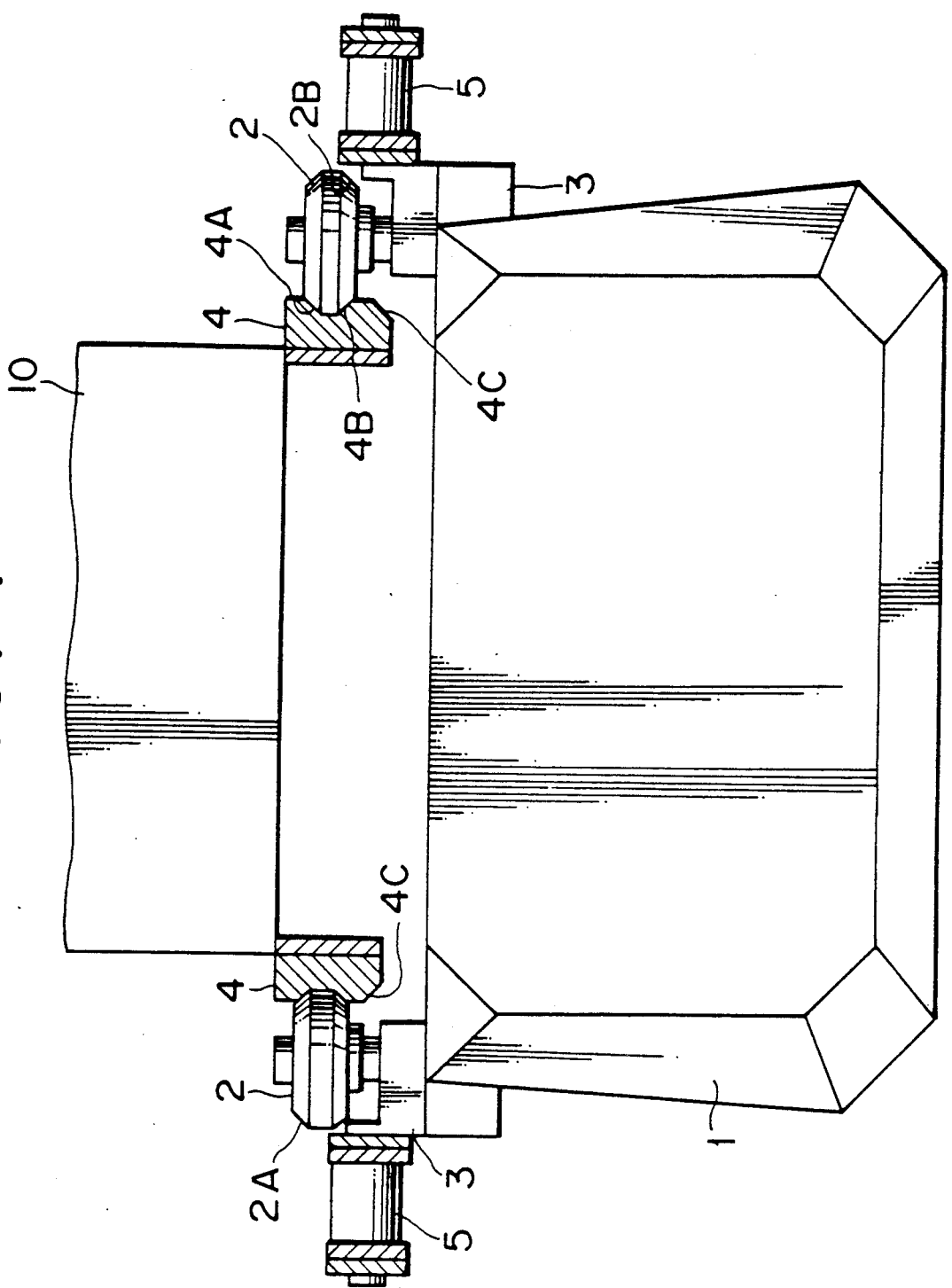
FIG. 7 is a section taken along the line 7—7 of FIG. 2, as seen when looking from the front of the ship unloader.

Referring first to FIGS. 1, 2 and 7, rollers 2 having a shape similar to that of the beads on an abacus are mounted on a pair of brackets 3 provided at the upper surface of the opposed sides of a bucket 1. Rails 4 are horizontally provided in the longitudinal direction over a distance which is substantially the same as or smaller than the distance between the axes of front and rear sprockets. The rails 4 are attached to the opposed sides of a horizontal shovelling arm 10 at positions which correspond to the locus of the horizontal rolling of the rollers 2. Each of the buckets 1 is fixed to one chain link of each of bucket chains 5 through the bracket 3. Front sprockets 6A are supported on the front end (the left end as viewed in FIG. 1) of a horizontal shovelling unit frame 10, and rear sprockets 6B are supported on the rear end of the horizontal shovelling unit frame 10. As shown in FIG. 1, sprockets 6C are fixedly provided above the rear sprockets 6B. The sprockets 6A, 6B and 6C are disposed so that they form an L-shaped area when they are seen from the side of the ship unloader. The horizontal shovelling unit frame 10 is moved up and down by a hydraulic cylinder 7 by virtue of a sliding portion 9 thereof being guided along a vertical frame 7A hanging from the forward end of a parallel link boom 20 of a ship unloader. A reference numeral 8 denotes a bottom (see FIG. 3), 111 denotes a cargo, and 21 denotes guide rollers.

Figure 10:
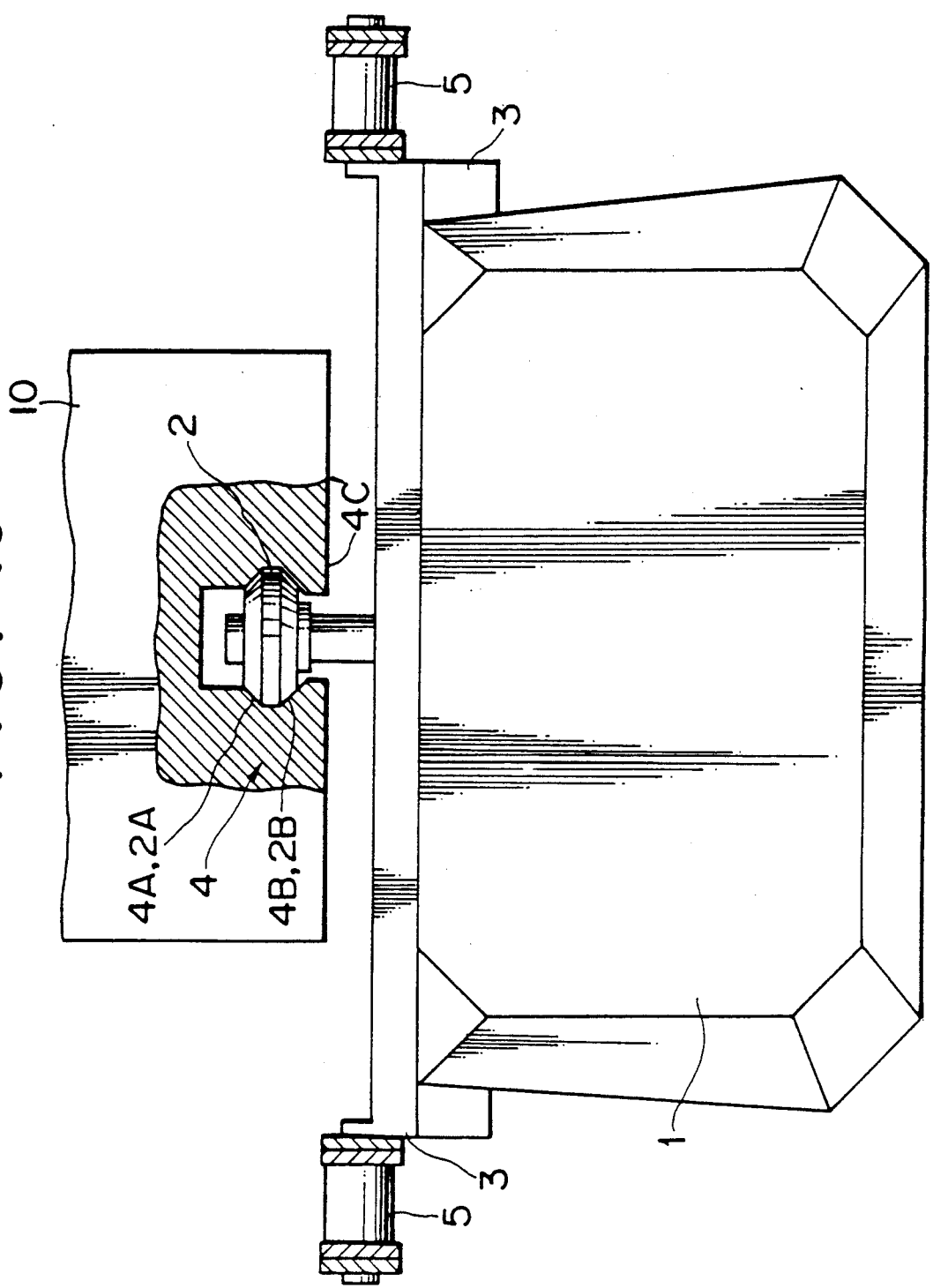

Each of the rails 4 has a guide groove having a V-shaped cross-section. The guide groove has inclined surfaces 4A and 4B which respectively engage with upper and lower slanted surfaces 2A and 2B formed on the roller 2. The rail 4 also has below the V-shaped guide groove a guide surface 4C along which the upper slanted surface 2A of the roller 2 is rolled. The guide surface 4C may also be forced as a horizontal surface 4C' (FIG. 10) with which the upper horizontal end surface of the roller 2 is brought into contact, as shown in FIG. 10. The rail 4 has at each of the longitudinal two end portions thereof (the right and left end portions as viewed in FIG. 1) a guide opening 4D (see FIG. 3), which is formed by the separation of the tapered surfaces 4A and 4B.

The thus-arranged present embodiment will be operated in the manner described below. A normal sidewise shovelling operation illustrated in FIG. 1 or 2 is performed by rotating the buckets 1 in a state where the rollers 2 thereof are guided by the rails 4 which are laid horizontally in the longitudinal direction while moving the buckets in the direction perpendicular to the plane of FIG. 2. At this time, the forces which act on the bucket 1 in a direction transverse to the direction of the bucket movement (in the horizontal direction as viewed in FIG. 7) and in the vertical direction are received by the rails 4. This means that the buckets 1 hang from the rails during the shovelling. So, only a bucket chain 5 which is rigid enough to be able to pull the buckets 1 is required. This also flattens the surface of the cargo being shovelled by the buckets 1, making its discharge a stable operation and ensuring an efficient unloading operation.

Figure 3:
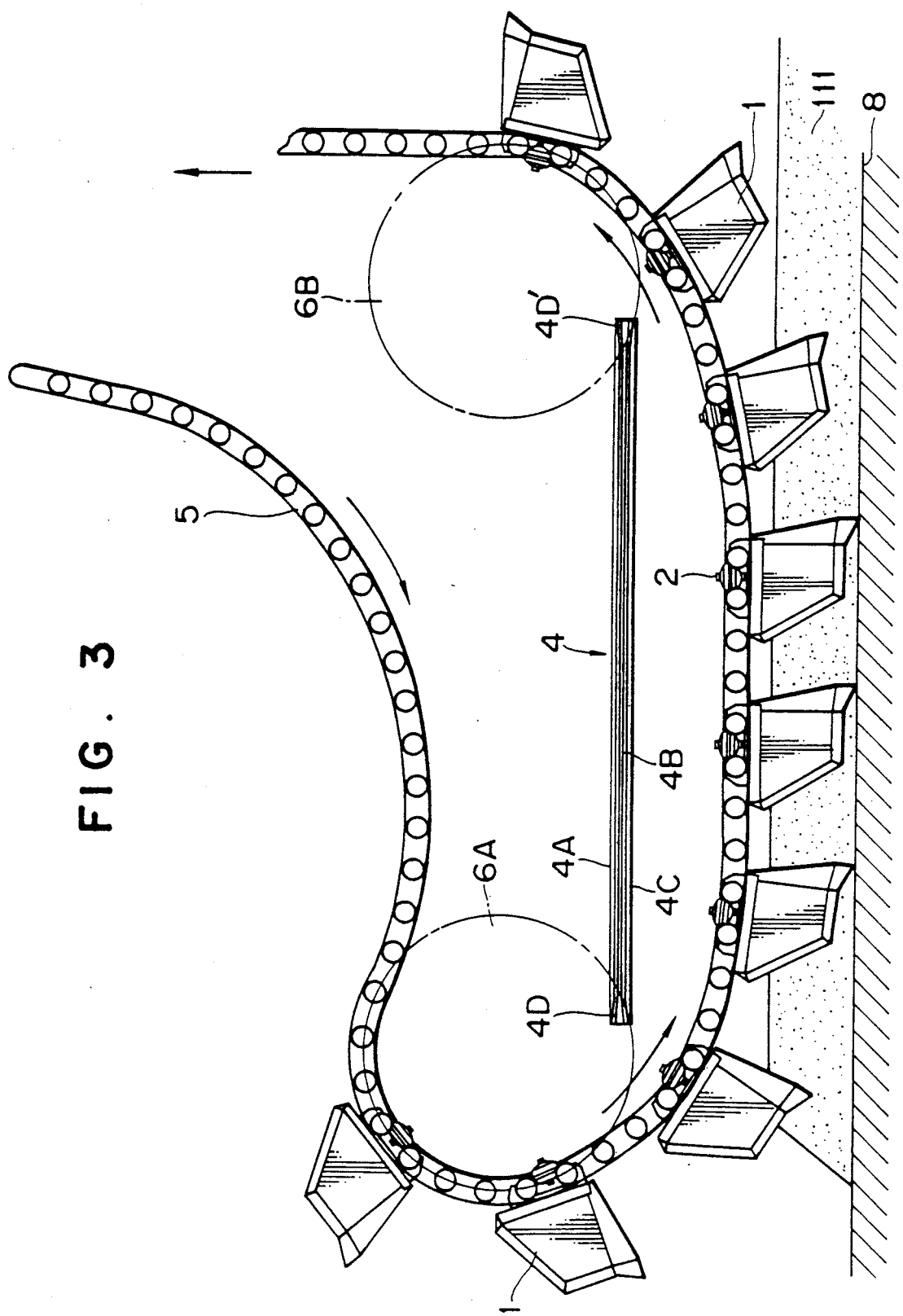
FIG. 3 is a side elevational view of the essential parts of the ship unloader of FIG. 1 with the buckets being in a cleaning up state.
Figure 4:
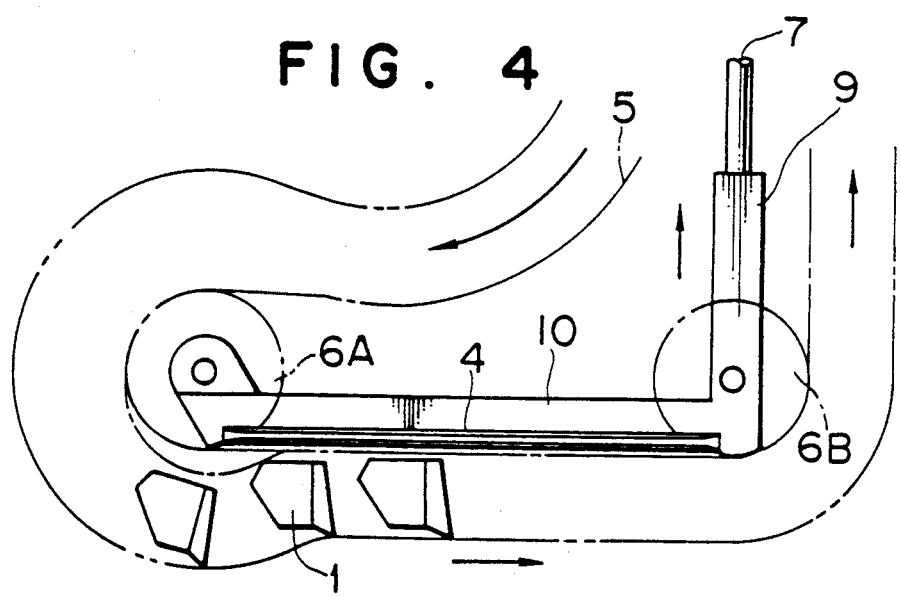
FIGS. 4, 5 and 6 explain the switching-over operation for the ship unloader which is required when it is switched over between a sidewise shovelling operation and a cleaning up operation.
Figure 5:
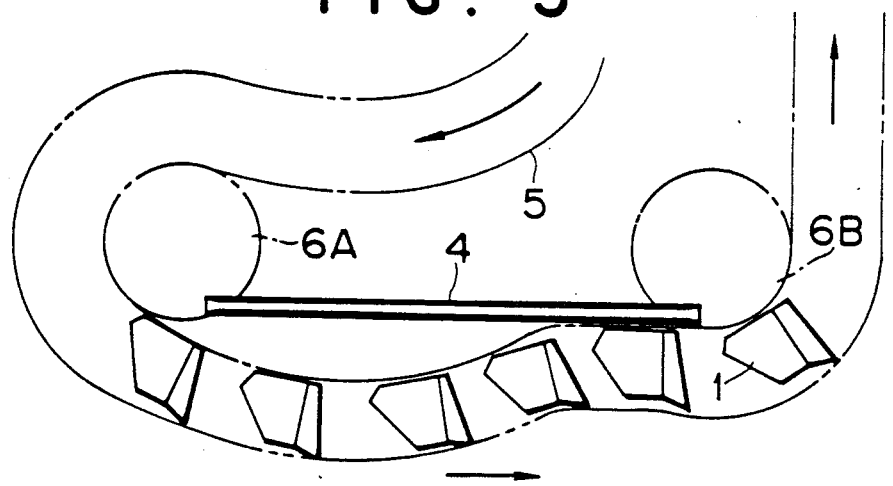
Figure 6:
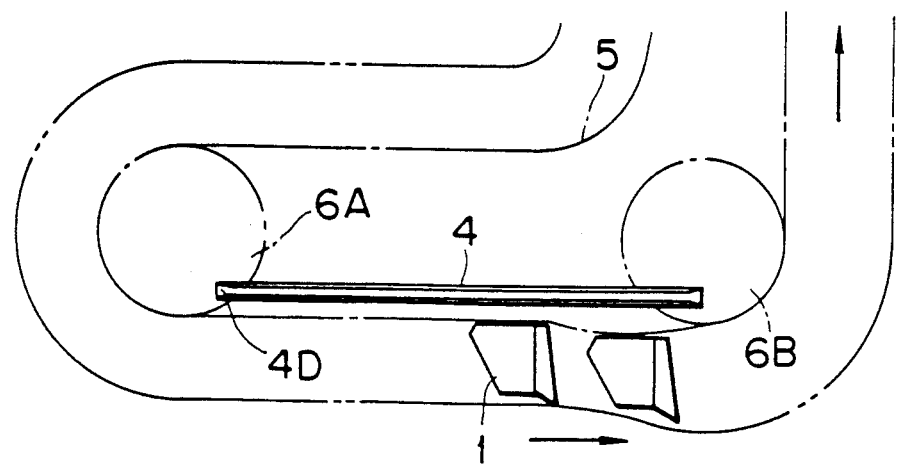

When the cargo 111 stored in the hold is decreased, the ship unloader is switched over to the cleaning up operation in the manner described below. Rotation of the bucket chains 5 is stopped, and the horizontal shovelling unit frame 10 is then lifted by the contraction of the hydraulic cylinder 7. Since the sprockets 6C are the fixed ones, lifting of the horizontal shovelling unit frame 10 reduces the distance between the sprockets 6B and the sprockets 6C, thus loosening the portions of each of the bucket chains 5 located above and below the front sprocket 6A, as shown in FIG. 4. Thereafter, the bucket chains 5 are rotated, as shown in FIG. 5, and this allows the subsequent rollers 2 to be moved on without being fitted in the V-shaped guide grooves 4A and 4B formed in the rails 4, finally making the bucket chains 5 assume the form of a catenary such as that shown in FIG. 3.

The bucket chains 5 which are in the form of a catenary are rotated with the buckets 1 in contact with the bottom 8 so as to shovel or clean up the cargo remaining at the bottom 8. During this cleaning up operation, the up and down movement of the bottom 8 is absorbed by the sagging of the bucket chains 5, and the buckets 1 and/or the bottom 8 are not damaged.

Figure 8:
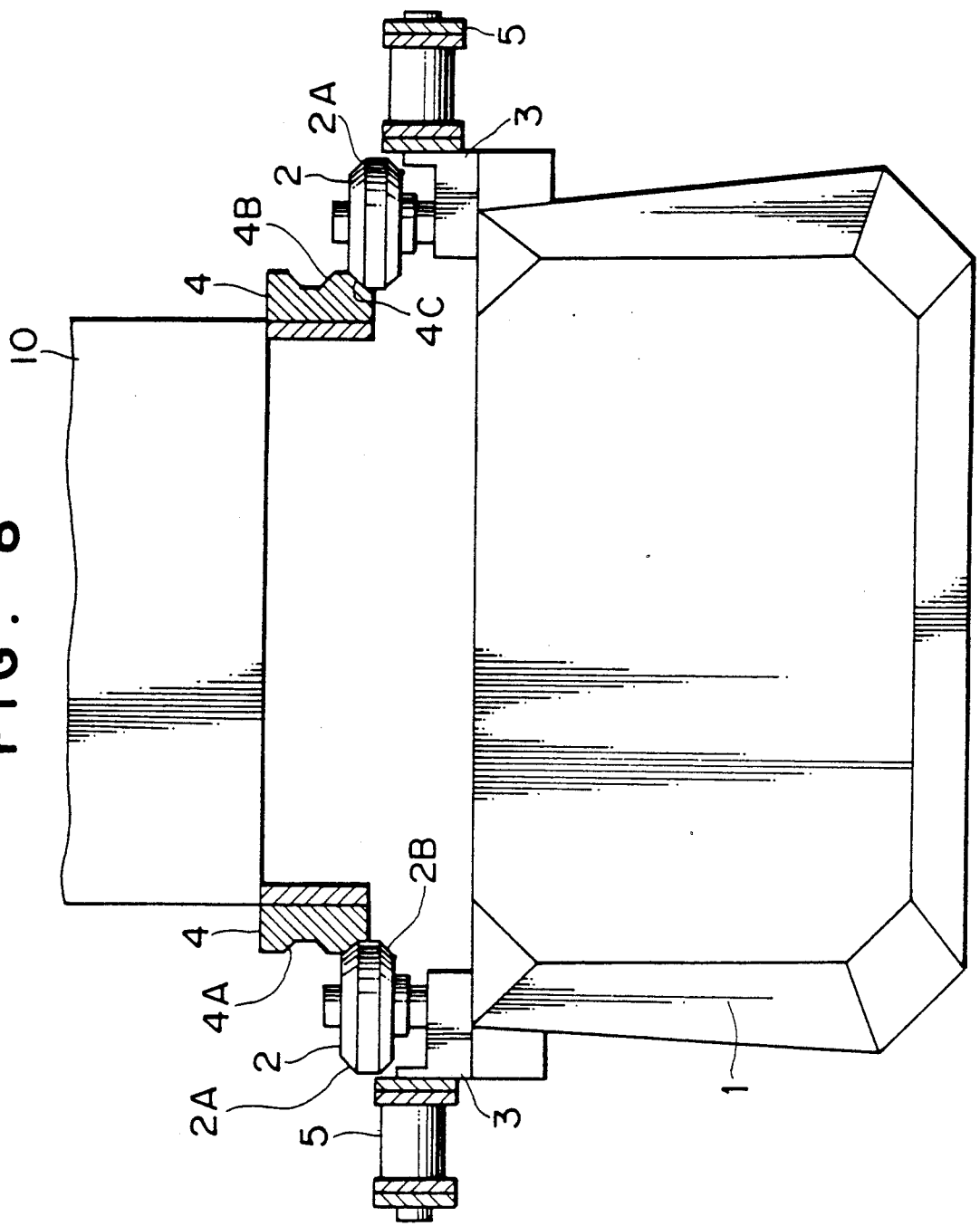
FIG. 8 is a view similar to FIG. 7, illustrating a state immediately before rollers are engaged with horizontal rails so as to provide for a sidewise shovelling state.

The ship unloader is returned to the normal sidewise shovelling operation mode from the catenary state shown in FIG. 3 as follows. First, rotation of the bucket chains 5 is stopped, and the horizontal shovelling unit frame 10 is then lowered by the stretching of the hydraulic cylinder 7. This results in stretching of the bucket chains 5. Next, the upper slanted surfaces 2A of the rollers 2 are brought into contact with the guide surfaces 4C of the rails 4, as shown in FIG. 8. Thereafter, the bucket chains 5 are rotated, and this allows the rollers 2 to be sequentially engaged with the rails 4 at the guide opening 4D formed at the front end portion thereof, thereby returning the ship unloader to a normal sidewise shovelling operation mode.

In this embodiment, the rollers having the form of a bead on an abacus are used. However, the rollers and the rails may be in any form, so long as they are capable of guiding the movement of the buckets and receiving the force exerted on the buckets in the vertical direction as well as in a direction transverse to the direction of the bucket movement.

Figure 9:
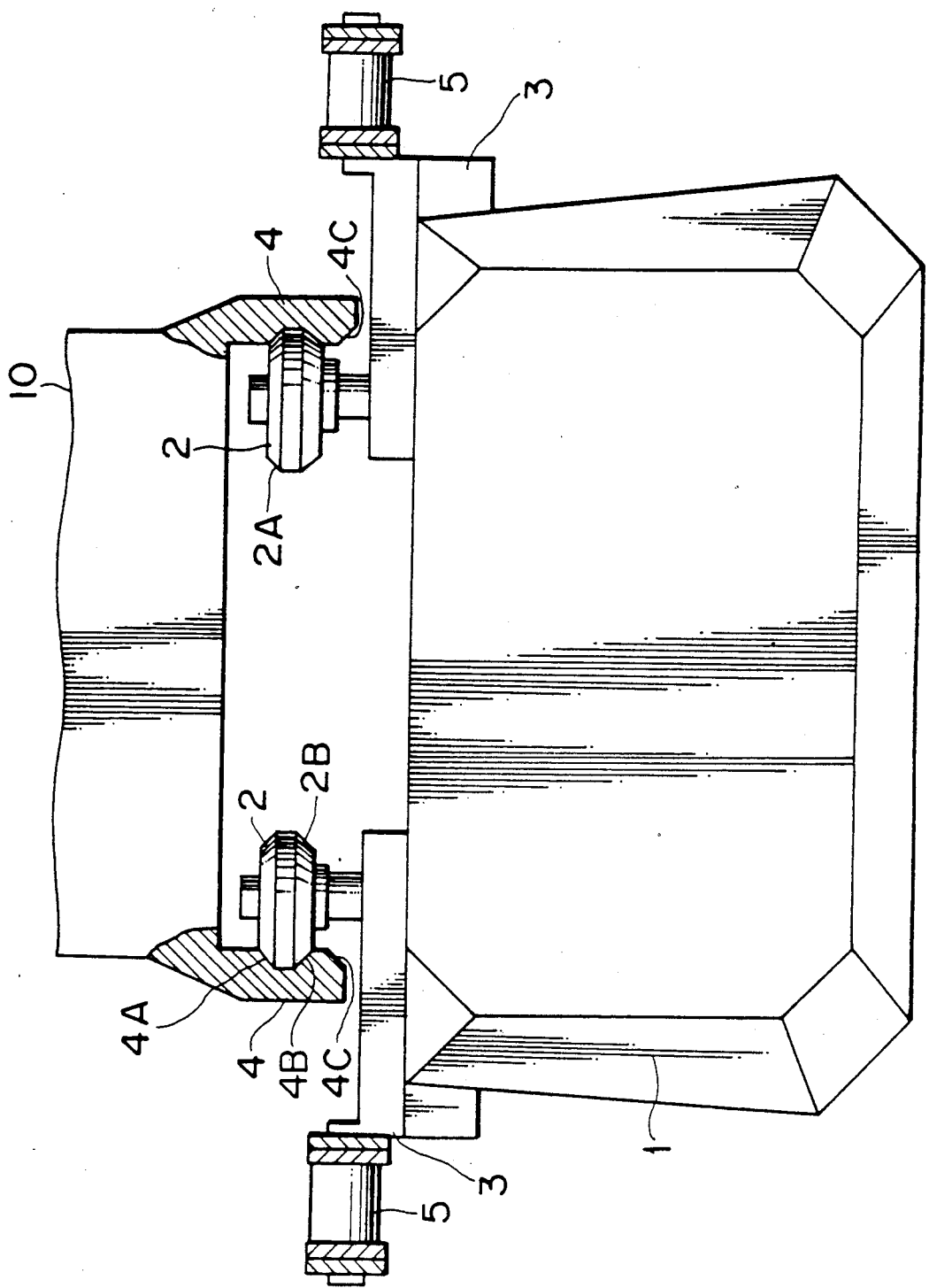
FIGS. 9 and 10 are views similar to FIG. 7, respectively illustrating a first modified example of the rollers and the horizontal rails in which the rollers are disposed on the inner side of the horizontal rails and a second modified example in which one roller is gripped between a pair of opposed V-shaped grooves.

In this embodiment, the rails 4 are formed on the outer side of the horizontal shovelling unit frame 10. However, they may also be formed on the inner surface of the horizontal shovelling unit frame 10 such that the guide grooves face each other, as shown in FIGS. 9 and 10. In the example shown in FIG. 10, it is to be noted that the diameter of the rollers is made slightly smaller than the distance between the two guide grooves.

In this embodiment, since the buckets run while they are being guided by the rails during a sidewise shovelling operation, the rails receive the force acting on the buckets in the vertical direction and in a direction transverse to the direction of the bucket movement. In consequence, bucket chains need only to pull the buckets, and the bucket chains need not to be as rigid and, hence, heavy as the ones employed in the prior technique.

When the ship unloader is switched over between a normal sidewise shovelling operation mode and a cleaning up operation mode, the rollers can be sequentially disengaged from or fitted on the rails first by raising or lowering the rails (that is, the horizontal shovelling unit frame) and then by rotating the bucket chains. Hence, the switching- over operation is very easy and requires no special members, making the entire apparatus simple. In addition to this, a sufficient degree of sagging can be provided in a catenary state, and this enables the resultant unloader to efficiently cope with the up-and-down movement of a ship's bottom.

In the present invention, a closing member 11 may be provided at the front end portion of each of the rails 4 to open and to close the guide opening 4D.

Figure 11:
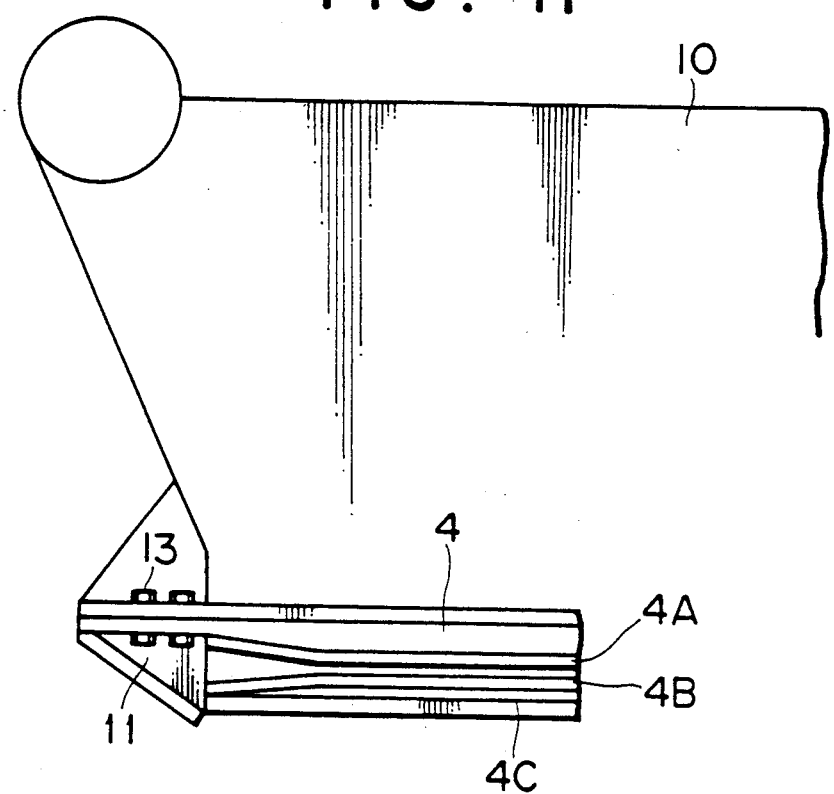
FIGS. 11, 12 and 13 are enlarged views, respectively illustrating different examples of a closing member provided a the front guide openings of the horizontal rails in the first embodiment.

A first example of the closing member 11 is shown in FIG. 11. This closing member 11 is mounted on the horizontal shovelling unit frame 10 by means of bolts 13. It is removed during a normal sidewise shovelling operation.

Figure 12:
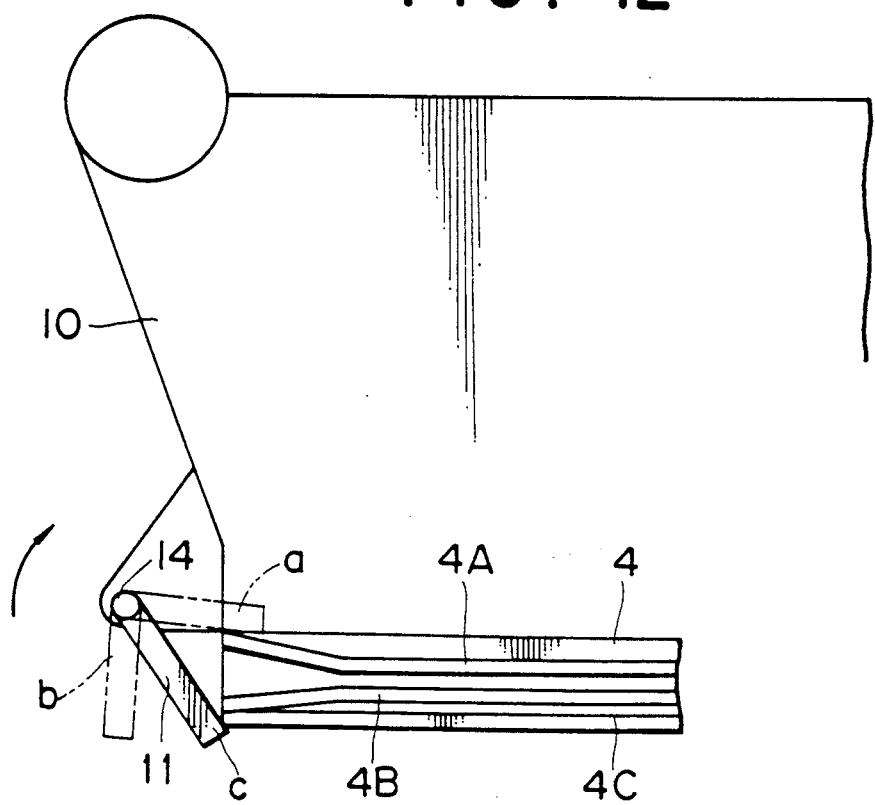

A second example of the closing member 11, which is shown in FIG. 12, is the one which is mounted on the front end portion of the horizontal shovelling unit fame 10 in such a manner as to be pivotal about a pin 14. When a normal sidewise shovelling operation is to be performed, this closing member 11 is pivoted in the direction indicated by the arrow in FIG. 12 so that it is located at position a. During a cleaning up operation, the closing member 11 is located at position b. The closing member 11 located at position b is turned to position c by the rollers 2 which make contact with the closing member 11, so that it guides the rollers 2 downward.

Figure 13:
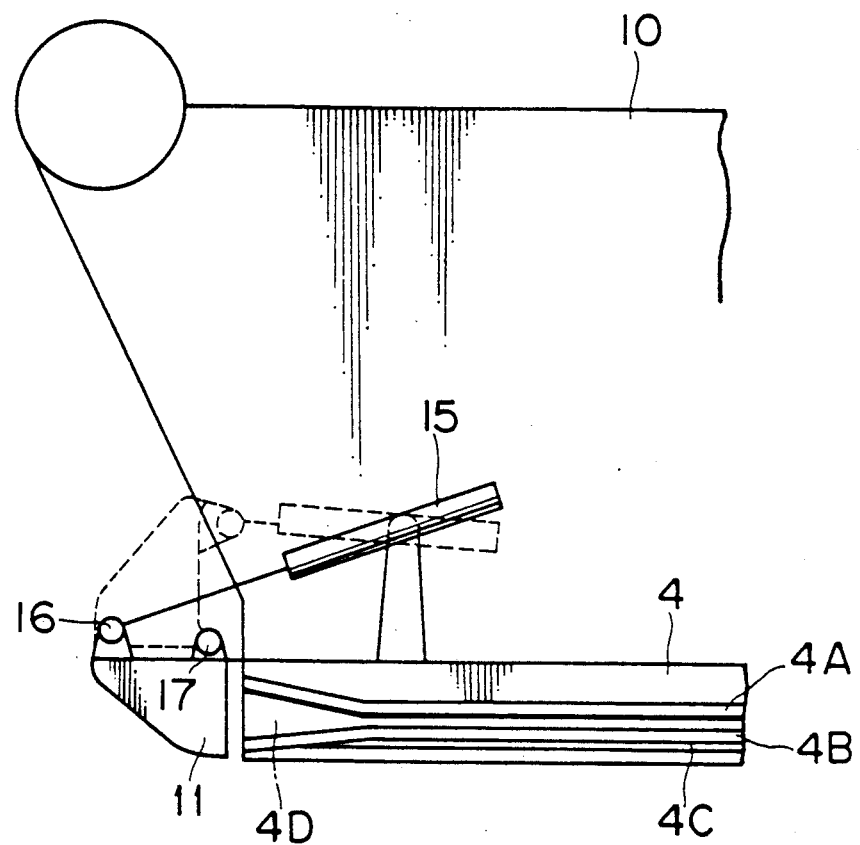

As shown in FIG. 13, a third example of the closing member 11 is represented by the one which is pivoted about a pivot 17 by a cylinder 15, which is connected to a coupling portion 16 of the closing member 11. This pivot operation is conducted under control of an operator sitting in an operation seat.

Provision of the closing members 11 makes a cleaning up operation stable. More specifically, when the cleaning up operation is to be performed, the horizontal shovelling unit frame 10 is lifted by the contraction of the hydraulic cylinder, thereby loosening the portions of each of the bucket chains located above and below the front sprocket 6A, as shown in FIG. 4. Thereafter, the closing members 11 are mounted on the horizontal shovelling unit frame 10 by means of the bolts 13 to close the guide openings 4D, as shown in FIG. 11, or the closing members 11 are made to hang in front of the guide openings 4D and are thereby located at position b, as shown in FIG. 12. Alternatively, the guide openings 4D are closed by means of the closing members 11 by the operation of the cylinder 15, as shown in FIG. 13. Subsequently, the bucket chains 5 are rotated, and this allows the subsequent rollers 2 to be moved on without being fitted into the V-shaped guide grooves on the rails 4, making the bucket chains 5 assume the form of a catenary shown in FIG. 3. Provision of any of the above-described closing members eliminates engagement of the rollers with the rails or striking of the rollers against the front end portions of the rails, which would occur when the bottom of a ship moves up excessively during a cleaning up operation or when a sufficient degree of sagging cannot be provided for. In particular, provision of the closing members prevents excessive force from being generated due to the engagement of the rollers with the front end portions of the rails and excessive impact from being caused due to the disengagement of the rollers from the front end portions of the rails.

Next, a second embodiment of the present invention will be described with reference to FIGS. 14 to 17. In this embodiment, the guide opening 4D provided at the front end of each of the rails 4 is brought as close to the center O of the front sprockets 6A as possible so that there are separated from each other only by L, whereas the guide opening 4D' provided at the rear end of the rail is separated as much as possible from the center O' of the rear sprockets 6B by L'. The present inventors conducted experiments and confirmed that it is preferable for L' and L to be respectively set to values equivalent to one pitch and half pitch of the bucket chain 5.

In this embodiment, since the guide opening 4D provided at the front end of each of the rails 4 is located as close to the center O of the front sprocket 6A as possible so that it is separated from the center O only by the distance indicated by L, the rollers 2 are not disengaged from the rails 4 during a sidewise shovelling operation, which would otherwise occur due to the contraction of the hydraulic cylinder 7 caused by the upward movement of a ship's bottom.

Figure 14:
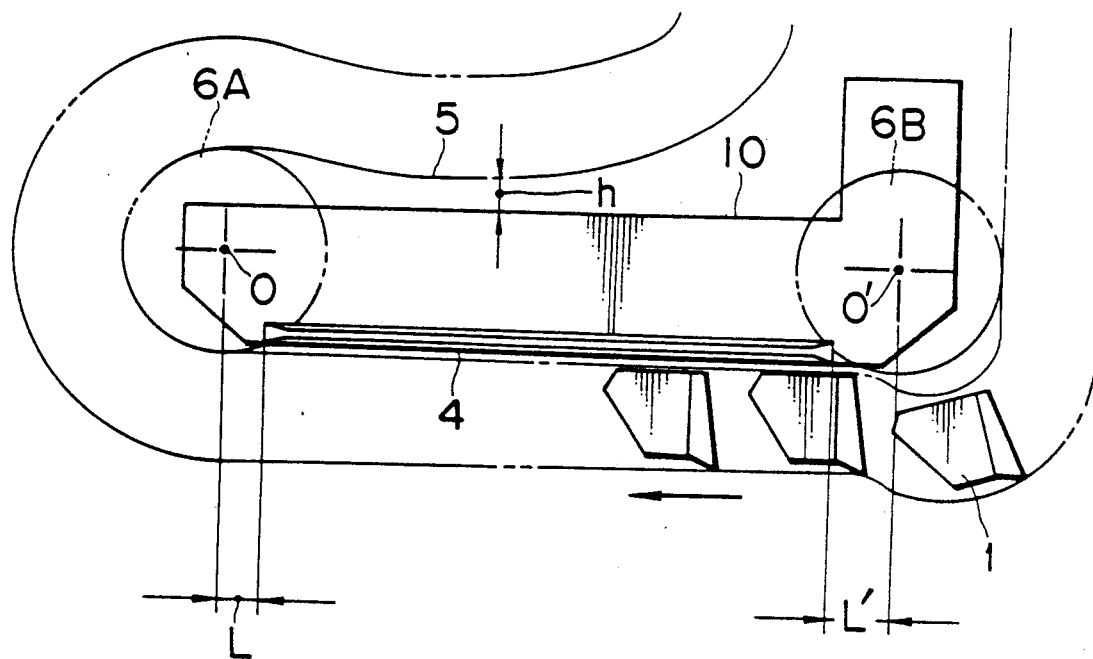
FIGS. 14 to 17 explain the switch-over operation which is required when a ship unloader is switched over between a sidewise shovelling operation and a cleaning up operation, showing a second embodiment of the present invention.
Figure 15:
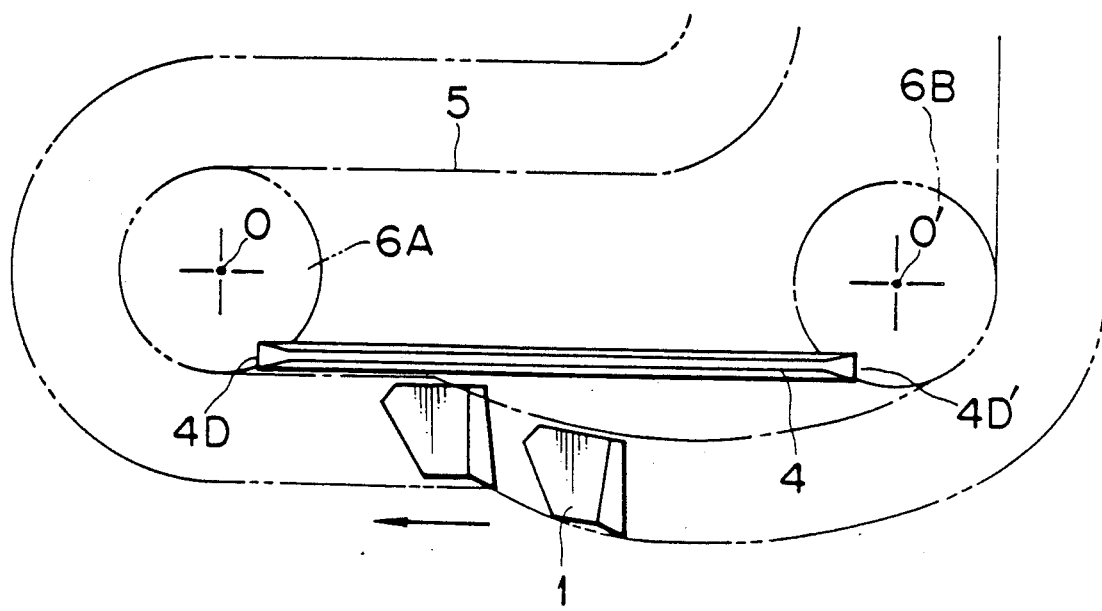

When the amount of cargo 11 stored in a hold is decreased, the ship unloader is switched over to a cleaning up operation mode in the manner described below. Rotation of the bucket chains 5 is stopped first, and the horizontal shovelling unit frame 10 is then lifted up by the contraction of the hydraulic cylinder 7. As a result, the distance between the sprockets 6B and 6C decreases because the sprocket 6C is a fixed one, and this loosens the portions of each of the bucket chains 5 located above and below the front sprocket 6A, as shown in FIG. 3. Thereafter, the bucket chains 5 are rotated in a reverse direction, as shown in FIG. 14, and this allows the subsequent rollers to be disengaged from the rails 4, as shown in FIG. 15, making the bucket chains 5 assume the form of a catenary shown in FIG. 3.

Since the guide opening 4D' provided at the rear end of each of the rails 4 is separated from the center O' of the rear sprocket 6B as much as possible by L', the rollers 2 can be disengaged from the rails 4 so as to put each of the bucket chains 5 in the form of a catenary even if the cylinder 7 is contracted by a short length. If L' is small, the cylinder 7 must be contracted by a large length so as to allow the rollers 2 to be disengaged from the rails 4. When the cylinder 7 is contracted by a large length, the gap h between the upper surface of the horizontal shovelling unit frame 10 and the bucket chain 5 reduces, thus causing interference between these members.

Next, the bucket chains 5 which are in the form of a catenary are rotated in the forward direction with the buckets 1 being in contact with the bottom 8 of a ship so as to shovel or clean up the cargo remaining at the ship's bottom. During this cleaning up operation, the up and down movement of the bottom 8 is absorbed by the sagging of the bucket chains 5, and the buckets 1 and/or the bottom 8 are not hence damaged.

Figure 16:
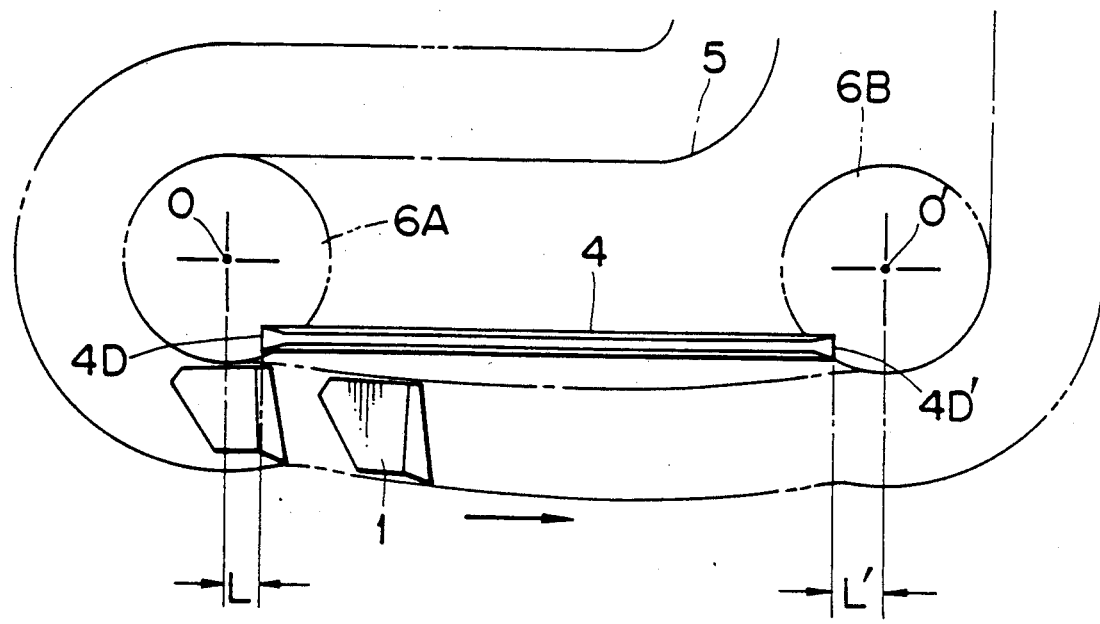
Figure 17:
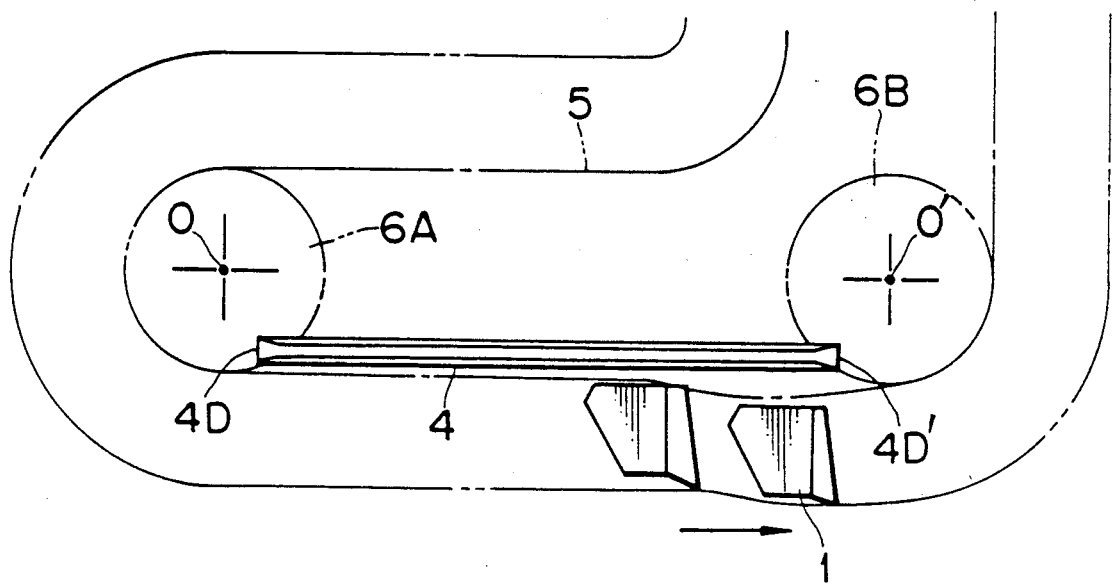

The ship unloader is returned to the normal sidewise shovelling operation mode shown in FIG. 2 from the cleaning up operation mode shown in FIG. 3 in the manner described below. First, rotation of the bucket chains 5 is stopped, and the horizontal shovelling unit frame 10 is then lowered by the stretch of the hydraulic cylinder 7 so as to make the bucket chains 5 taut. Next, the upper slanted surfaces 2A of the rollers 2 are brought into contact with the guide surfaces 4C of the rails 4. Thereafter, the bucket chains 5 are rotated in the forward direction, and this allows the rollers 2 to be sequentially engaged with the rails 4 near the front sprockets 6A, as shown in FIG. 16, thereby returning the the ship unloader to a normal sidewise shovelling operation mode, as shown in FIG. 17.

In this embodiment, the front end portion of each of the rails is located as close to the center of each of the front sprockets as possible, whereas the rear end portion of the rail is separated as much as possible from the center of the rear sprocket. In consequence, the ship unloader can be switched over easily between a normal sidewise shovelling operation mode and a cleaning up operation mode, and the rollers are not disengaged from the rails during a sidewise shovelling operation. Furthermore, since the ship unloader can be switched over to a cleaning up operation mode by moving up the horizontal shovelling unit frame through a short distance, interference occurring between the bucket chains and the upper surface of the horizontal shovelling unit frame can be eliminated.

Figure 18:
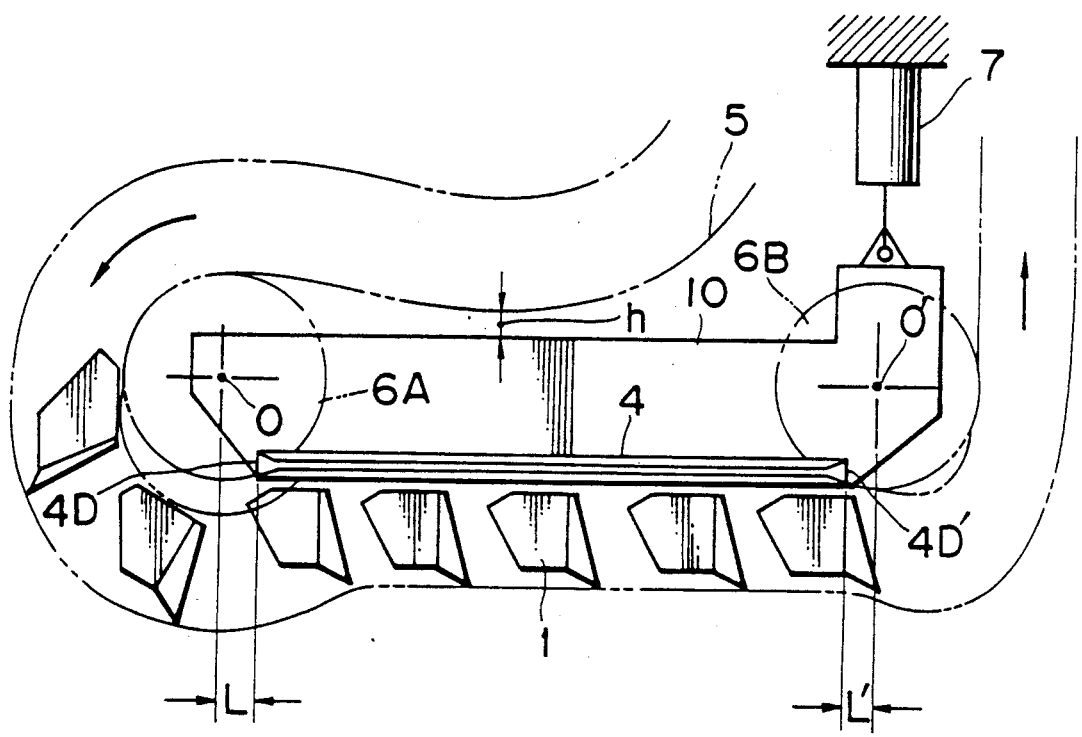
FIGS. 18 and 19 explain the switch-over operation which is required when a ship unloader is switched over between a sidewise shovelling operation and a cleaning up operation, showing a third embodiment of the present invention.
Figure 19:
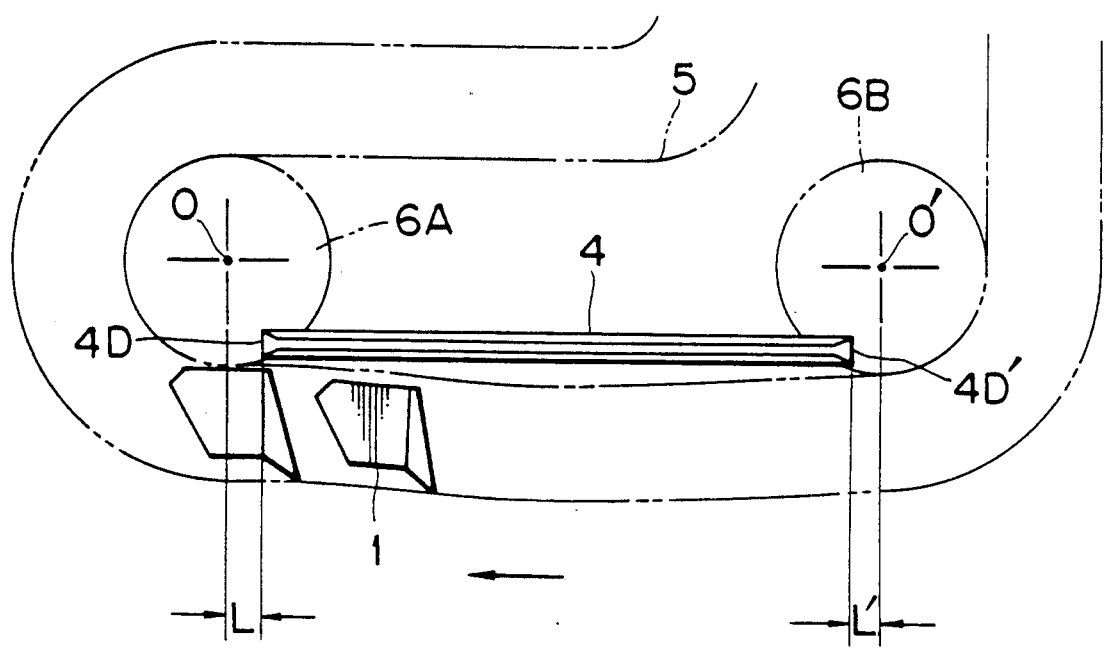
Figure 20:
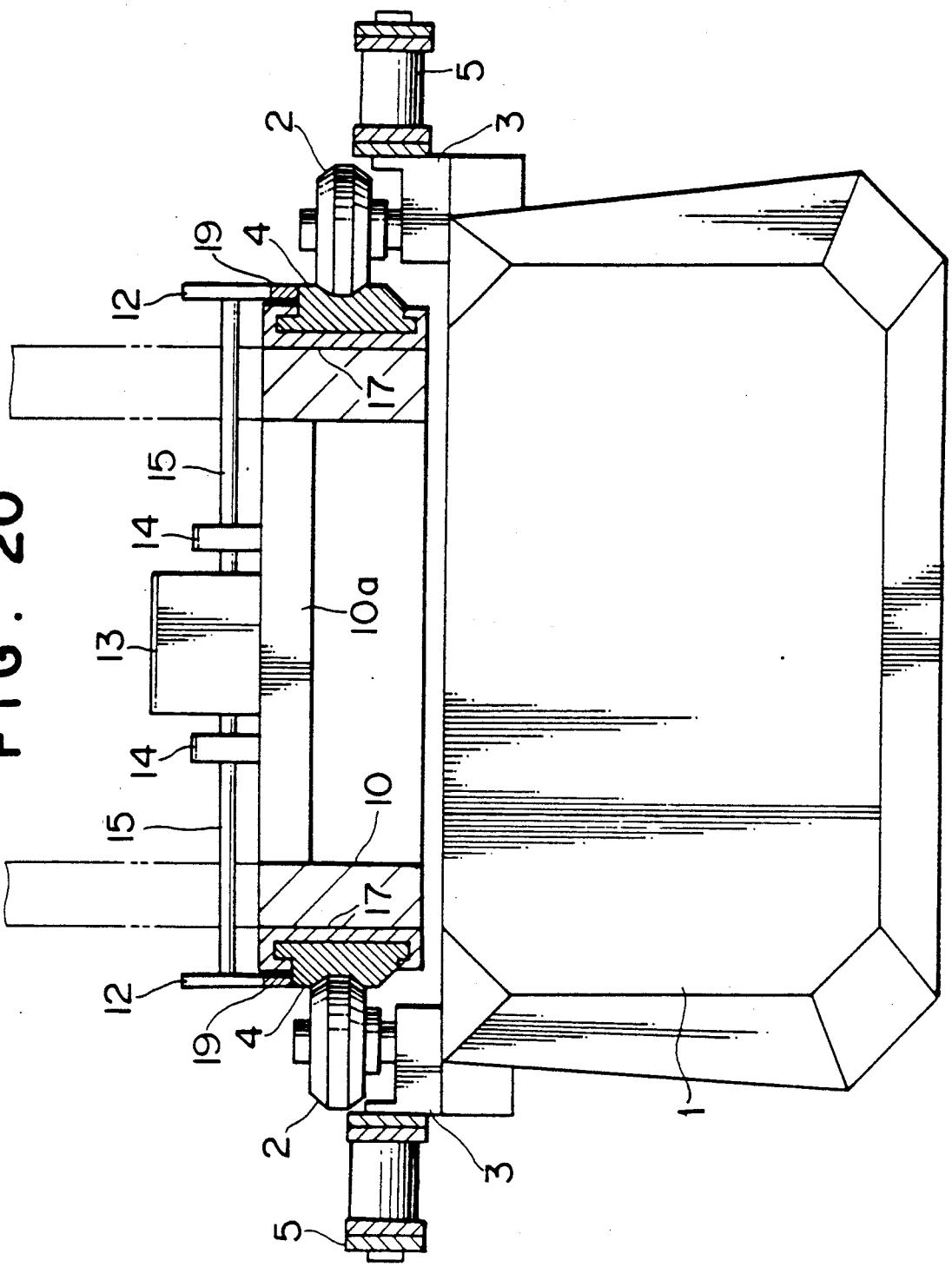
FIG. 20 is a front view of the essential parts of the ship unloader, showing a fourth embodiment of the present invention.

Next, a third embodiment of the present invention will be described below with reference to FIGS. 18 and 19.

In this embodiment, the guide opening 4D provided at the front end of each of the rails 4 is separated from the center O of each of the sprockets 6A as much as possible by L, and the guide opening 4D' provided at the rear end of the rail is brought as close to the center O' of each of the rear sprockets 6B as possible so that they are separated from each other by L'. In other words, the distance between the front end portion of each of the rails 4 and the center O of each of the front sprockets 6A is made larger than the distance between the rear end portion of each of the rails 4 and the center O' of each of the rear sprockets 6B. The present inventors conducted experiments and confirmed that it is preferable for L and L' to be respectively set to values equivalent to one pitch and half pitch of the bucket chain 5.

The operation of the thus-arranged ship unloader will be now described. A normal sidewise shovelling operation is performed by rotating the buckets 1 in a state where the rollers 2 thereof are guided along the rails 4 that are laid horizontally in the longitudinal direction while moving the buckets in the direction perpendicular to the plane of FIG. 2, as in the first embodiment.

When the cargo 111 stored in the hold is decreased, the ship unloader is switched over to the cleaning up operation mode in the manner described below. First, rotation of the bucket chains 5 is stopped, and the horizontal shovelling unit frame 10 is then lifted by the contraction of the hydraulic cylinder 7. Since the sprockets 6C are the fixed ones, lifting of the horizontal shovelling unit frame 10 reduces the distance between the sprockets 6B and the sprockets 6C, thus loosening the portions of each of the bucket chains 5 located above and below the front sprocket 6A, as shown in FIG. 3.

Since the guide opening 4D provided at the front end of each of the rails 4 is separated from the center O of each of the front sprockets 6A by the largest distance L, the bucket chains 5 can be given the form of a catenary even when the hydraulic cylinder 7 is contracted by a small length. At this time, the distance h between the upper surface of the horizontal shovelling unit frame 10 and the bucket chains 5 does not reduce to a large extent, and interference between the horizontal shovelling unit frame 10 and the bucket chains 5 can be thus eliminated.

Thereafter, the bucket chains 5 are rotated in the forward direction, and this allows the rollers to be sequentially disengaged from the rails 4, thereby putting the bucket chains 5 in the form of a catenary.

The ship unloader is returned to a normal sidewise shovelling operation mode shown in FIG. 2 from a catenary state shown in FIG. 3 as follows: First, rotation of the bucket chains 5 is stopped, and the horizontal shovelling unit frame 10 is then lowered by the stretch of the hydraulic cylinder 7. This results in the stretching of the bucket chains 5. So, the upper slanted surfaces 2A of the rollers 2 are brought into contact with the guide surfaces 4C of the rails 4. Thereafter, the bucket chains 5 are rotated in the reverse direction. Since the guide opening 4D' provided at the rear end portion of the rail 4 is located as close to the center O' of the rear sprocket 6B as possible so that they are separated from each other only by L', the reverse rotation of the bucket chains 5 allows the rollers 2 to be sequentially and smoothly engaged with the rails near the rear sprockets 6B, thereby returning the ship unloader to a normal sidewise shovelling operation mode.

In this embodiment, the front end portion of each of the rails is separated from the center of each of the front sprockets as much as possible, whereas the rear end portion of the rail is located as close to the center of each of the rear sprockets as possible. In consequence, the ship unloader can be switched over easily between a normal sidewise shovelling operation mode and a cleaning up operation mode. Furthermore, since the front end portions of the rails are separated from the center of the front sprockets as much as possible, the ship unloader can be switched over to a cleaning up operation mode by moving up the horizontal shovelling unit frame through a short distance, and interference occurring between the bucket chains and the upper surface of the horizontal shovelling unit frame can be thus eliminated. Furthermore, interference between the rollers and the rails or scoop of the rollers caused by the lifting of the buckets during the cleaning up operation can be eliminated.

Further, since the rear end portion of each of the rails is located as close to the center of the rear sprocket as possible, the rollers are engaged with the rails without making the bucket chains very taut, and damage to the rollers and the rails can be eliminated.

Next, a fourth embodiment of the present invention will be described below with reference to FIGS. 1, 2, 3 and 20. In this embodiment, the horizontal rails 4 are laid in the longitudinal direction over a length which is smaller than the distance between the axes of the front and rear sprockets. Furthermore, the openings 4D and 4D' are respectively formed at the front and rear ends of each of the rails 4, as in the case of other embodiments. The present embodiment is characterized in that the horizontal rails 4 are fitted in guide members 17 in such a manner as to be slidable in the longitudinal direction. Each of the guide members 17 is fixed to the outside of the horizontal shovelling unit frame 10. A short rack 19 is attached to the upper surface of the outer edge of each of the horizontal rails 4, and this rack 19 is engaged with a pinion 12. The pinions 12 are driven by a motor 13 in the forward and reverse directions. The motor 13 is mounted on a lateral rib 10a of the horizontal shovelling unit frame 10. The power of the motor 13 is transmitted to the pinions 12 through a rotary shaft 15 supported by bearings 14.

Next, the operation of this embodiment will be described. During a normal sidewise shovelling operation, the buckets 1 travel in the horizontal direction by virtue of the rollers 2 thereof being guided by the horizontal rails 4 so as to shovel the cargo 11 in the hold as shown in FIGS. 1 and 2. After the buckets 1 pass through the rear sprocket 6B, they move up in the vertical direction and thereby carry the cargo to a belt conveyor. Since the entirety of this bucket elevator type continuous ship unloader moves in the direction perpendicular to the plane of FIG. 2 during the normal shovelling operation, the cargo 111 can be successively shovelled by the subsequent buckets 1.

When the cargo 111 stored in the hold is decreased, the ship unloader is switched over to the cleaning up operation mode in the manner described below. First, rotation of the bucket chains 5 is stopped, and the horizontal shovelling unit frame 10 is then lifted by the contraction of the hydraulic cylinder 7, thereby reducing the distance between the sprockets 6B and the sprockets 6C (not shown) disposed above the sprockets 6B and loosening the portions of each of the bucket chains 5 located above and below the front sprocket 6A, as shown in FIG. 3. Thereafter, the bucket chains 5 are rotated in the forward direction, and this allows the subsequent rollers 2 to be moved on without being fitted in the V-shaped guide grooves 4A and 4B formed in the rails 4, thereby putting the bucket chains 5 in the form of a catenary.

The cleaning up operation can be performed by rotating the bucket chains 5 which are in the form of a catenary in the forward direction in a state where the buckets 1 are in contact with the bottom 8. During this cleaning up operation, the up and down movement of the bottom 8 is absorbed by the sagging of the bucket chains 5, and the buckets 1 and/or the bottom 8 are not hence damaged.

The ship unloader is returned to the normal sidewise shovelling operation mode from a catenary state as follows. First, rotation of the bucket chains 5 is stopped, and the horizontal shovelling unit frame 10 is then lowered by the stretch of the hydraulic cylinder 7. This results in the stretching of the bucket chains 5. Next, the bucket chains 5 are rotated in the reverse direction, and this allows the rollers 2 to be sequentially engaged with the horizontal rails 4 at the guide openings 4D' formed at the rear end portions of the rails.

Now, setting of the horizontal rails 4 in the above-described operations will be described. During a normal sidewise shovelling operation, the horizontal rails 4 are located as close to the forward sprockets 6A as possible, e.g., the front openings 4D of the horizontal rails 4 are aligned with the center of the front sprockets 6A. This is achieved by causing the horizontal rails 4 to slide forward within the guide members 17 by the motor 13 whose driving force is transmitted to the horizontal rails 4 through the rotary shaft 15, the pinions 12 and then the racks 19. In consequence, the rollers 2 can be scooped without fail even if the bucket chains 5 become loosened during the shovelling operation.

During a cleaning up operation, the horizontal rails 4 are located as close to the rear sprockets 6B as possible with the front openings 4D of the horizontal rails 4 separated from the front sprockets 6A as much as possible. In consequence, the possibility of the rollers 4 being scooped by the horizontal rails 4 can be eliminated.

When the ship unloader is switched over from the normal sidewise shovelling operation mode to the cleaning up operation mode, the horizontal rails 4 are caused to approach the rear sprockets 6B as much as possible, and the bucket chains 5 are then rotated in the forward direction. As a result, the rollers 2 are not scooped by the horizontal rails 4, and the bucket chains 5 are readily put in the form of a catenary by raising the horizontal shovelling unit frame 10 over a short distance.

When the ship unloader is switched over from the cleaning up operation mode to the normal sidewise shovelling operation mode, the horizontal rails 4 are caused to approach the rear sprockets 6B, and the bucket chains 5 are then rotated in the reverse direction.

Furthermore, the ship unloader may also be switched over from the normal sidewise shovelling operation mode to the cleaning up operation mode by separating the rear openings 4D' of the horizontal rails 4 from the center of the rear sprockets 6B as much as possible and then by rotating the bucket chains 5 in the reverse direction.

Furthermore, the ship unloader may also be returned to the sidewise shovelling operation mode from the cleaning up operation mode by causing the front openings 4D of the horizontal rails 4 to approach the center of the front sprockets 6A as much as possible and then by rotating the bucket chains 5 in the forward direction.

The horizontal rails 4 may also be caused to slide in the longitudinal direction by a hydraulic cylinder 16 shown in FIG. 21 through a link 18.

In this embodiment, the horizontal rails into which the rollers provided at the upper end of a bucket are fitted are caused to slide in the longitudinal direction so that they can be moved toward or separated from the front and rear sprockets. This ensures smooth operation of a bucket elevator type continuous ship unloader which can be used for both a normal sidewise shovelling operation and a cleaning up operation.

More specifically, during a normal sidewise shovelling operation, striking of the rollers against the front openings of the horizontal rails can be avoided, and disengagement of the rollers from the horizontal rails can be prevented. During a cleaning up operation, striking of the rollers against the front openings of the horizontal rails can be avoided, and this prevents the rollers from being scooped by the horizontal rails, which would otherwise make the cleaning up operation impossible. Further, the ship unloader can be smoothly switched over between the normal sidewise shovelling operation mode and the cleaning up operation mode.

What is claimed is:

1. A bucket elevator type ship unloader comprising:
   a horizontal shovelling unit frame;
   a lower front sprocket and a lower rear sprocket rotatably supported on front and rear end portions of said horizontal shovelling unit frame, respectively;
   at least one upper sprocket rotatably supported above said lower rear sprocket;
   endless bucket chains wound around said front and rear sprockets and said upper sprocket such that said chains encircle an L-shaped area as seen when looking in a sidewise direction;
   a series of buckets mounted on said bucket chains at predetermined intervals;
   means for moving said shovelling unit frame up and down relative to said upper sprocket;
   at least one roller mounted on each of said buckets in a vicinity of a portion thereof through which said bucket is mounted on said bucket chains; and
   at least one horizontal rail provided on said shovelling unit frame along a path of said bucket chains which runs between said front and rear sprockets on a straight line such that said at least one horizontal rail engages with each roller of each of said buckets, each roller travelling in a state where each roller is in engagement with said at least one horizontal rail when said bucket chains are stretched tautly between said front and rear sprockets by downward movement of said shovelling unit frame, wherein each roller disengages from said at least one horizontal rail by upward movement of said shovelling unit frame and rotation of said chains so as to put said chains into a form of a catenary.

2. A continuous ship unloader according to claim 1, wherein said roller has a form similar to that of a bead on an abacus, and wherein said horizontal rail has a V-shaped groove corresponding to said bead-like shape.

3. A continuous ship unloader according to claim 2, wherein the bottom surface of said horizontal rail is inclined so as to form an inclined surface which fits the upper surface of said bead-shaped roller.

4. A continuous ship unloader according to any of claim 1, 2, or 3 either wherein each of said buckets has two rollers with one roller on each side thereof, and wherein said horizontal shovelling unit frame has two horizontal rails with each rail located on the inner side of the associated roller.

5. A continuous ship unloader according to any one of claims 1, 2, or 3 wherein each of said buckets has two rollers with one roller on each side thereof, and wherein said horizontal shovelling unit frame has two horizontal rails with each rail located on the outer side of the associated roller.

6. A continuous ship unloader according to any one of claim 1, 2, or 3 wherein each of said buckets has one roller at the center thereof, and wherein said horizontal shovelling unit frame has two horizontal rails which grip said roller.

7. A continuous ship unloader according to claim 1, wherein said horizontal rail has a groove into which said roller is fitted and which is expanded toward a front inlet end and a rear outlet end thereof at the front and rear end portions of said horizontal rail in the longitudinal direction.

8. A continuous ship unloader according to claim 7, including a closing member for closing the front inlet end of said groove.

9. A continuous ship unloader according to claim 8, wherein said closing member is detachably mounted on said horizontal shovelling unit frame.

10. A continuous ship unloader according to claim 8, wherein said closing member is a plate pivotaly mounted on the front end portion of said horizontal shovelling unit frame such that it hangs in front of said inlet end.

11. A continuous ship unloader according to claim 8, wherein said closing member is pivotaly mounted on the front end portion of said horizontal shovelling unit frame in such a manner that it opens or closes the inlet of said groove by the operation of a cylinder.

12. A continuous ship unloader according to claim 1, wherein said bucket chain is capable of being rotated in an opposite direction.

13. A continuous ship unloader according to claim 12, wherein the front end of said horizontal rail is separated from the center of said front sprocket rearwardly by a predetermined distance whereas the rear end of said horizontal rail is separated from the center of said rear sprocket frontwardly by a predetermined distance, the former distance being smaller than the latter distance.

14. A continuous ship unloader according to claim 13, wherein said former distance is about one half pitch of said bucket chain, and said latter distance is about one pitch of said bucket chain.

15. A continuous ship unloader according to claim 12, wherein the front end of said horizontal rail is separated from the center of said front sprocket rearwardly by a predetermined distance whereas the rear end of said horizontal rail is separated from the center of said rear sprocket frontwardly by a predetermined distance, the former distance being larger than the latter distance.

16. A continuous ship unloader according to claim 15, wherein said former distance is about one pitch of said bucket chain, and said latter distance is about one half pitch of said bucket chain.

17. A continuous ship unloader according to claim 12, wherein said horizontal rail is made shorter than the distance between the axes of said front and rear sprockets and is provided in such a manner as to be slidable in the longitudinal direction.

18. A continuous ship unloader according to claim 17, including a rack mounted on said horizontal rail in such a manner that it extends in the longitudinal direction, and a pinion engaged with said rack, said pinion being driven in the forward and reverse directions by a motor.

19. A continuous ship unloader according to claim 17, wherein said horizontal rail is caused to slide in the longitudinal direction by a hydraulic cylinder.

* * * * *